Figure 1:
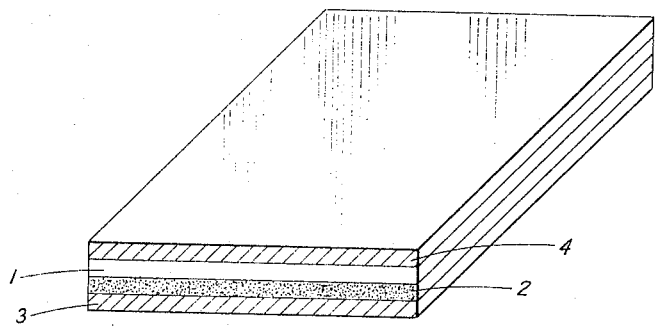

Nov. 1, 1966  R. M. RULON  3,283,194
ELECTROLUMINESCENT LAMP WITH A BARIUM TITINATE LAYER
Filed Nov. 16, 1955

INVENTOR:
RICHARD M. RULON

BY Lawrence Burns,

ATTORNEY.

United States Patent Office 3,283,194
Patented Nov. 1, 1966

3,283,194
ELECTROLUMINESCENT LAMP WITH A
BARIUM TITANATE LAYER
Richard M. Rulon, Wenham, Mass., assignor, by mesne assignments, to Sylvania Electric Products Inc., Wilmington, Del., a corporation of Delaware
Filed Nov. 16, 1955, Ser. No. 547,191
4 Claims. (Cl. 313—108)

This invention relates to electroluminescent lamps and similar devices in which a phosphor emits light when subjected to an electric field. The field is generally obtained by applying a varying voltage across a thin layer of a phosphor and dielectric mixture, the voltage being applied between extended electrodes on each side or adjacent to the surface of said layer.

Other conditions being equal, the luminescent brightness of such materials is limited by the voltage which can be applied. When the voltage is too high, bright spots appear to scintillate over the surface of the device, leaving behind them dark spots which will no longer luminesce. This scintillation is caused by dielectric failure in the light emitting layer.

I have discovered that the voltage at which such scintillation and deterioration of the lamp occurs can be greatly increased by placing between the phosphor dielectric layer and at least one electrode, a parallel layer of a material having extremely high dielectric strength and dielectric constant. Materials of suitably high constant are, for example, the titanates, zirconates or stannates of barium, magnesium, lead or strontium, as well as other substances.

The material of high dielectric constant can be present as a thin fused layer of a substance such as one of those mentioned above or as one or more of such materials in powdered form embedded in a glaze or the like.

The phosphor-dielectric layer in lamps of this type can be of a few thousandths of an inch in thickness, as was customary in present commercial lamps prior to my invention, or it can be only a fraction of said thickness. In the latter case, luminescent brightness, for a given voltage between the electrodes, will be greatly increased. The high-constant materials can be used in combination to reduce the variation in dielectric constant with temperature. For example, a composition of essentially 96% barium titanate and 4% lead titanate can be used. The high-constant layer functions as a protective series capacitor for the phosphor-ceramic layer in such a manner that the voltage loss in the protective layer, due to the high dielectric constant, is an extremely small fraction of the total voltage applied between the two conductive layers until or unless the phosphor-ceramic layer is punctured electrically.

It is desirable that the dielectric constant of the series capacitor material be considerably higher than the dielectric constant of the electroluminescent layer. The higher the dielectric constant of the material used, the more effective will be the action of this capacitor layer for a given dielectric thickness. If a point failure occurs in the phosphor-ceramic layer, then the entire voltage is applied to the layer of high dielectric constant. At this point, since the layer will withstand this voltage, no further deterioration will occur at such a point. By making the high dielectric constant material sufficiently thick, say .020 inch or greater, I have made lamps which have a phosphor-ceramic layer of the customary 2 mil thickness used for 120 volt operation in commercial lamps. The normal lamps so made will puncture through the phosphor-ceramic layer at 200 to 300 volts, but the protective characteristics of the additional layer will permit satisfactory operation at voltages up to at least 1000 volts with no general failure. I have made lamps of this construction which give the usual luminescent brightness of about 0.1 ft. lambert at 120 volts but which can be operated at voltages as high as 1000 volts, without failure, and with greatly increased brightness. I have operated such lamps at 20–30 ft. lamberts at about 800 volts.

The requirements for the successful production of a lamp of this type are that the protective series-capacitance layer shall be of dielectric strength sufficient to withstand the maximum operating voltage and of dielectric constant sufficiently high to keep the voltage drop across it small with respect to the total applied voltage. I have found that by using a 0.025 inch thick layer of a barium titanate type of ceramic body containing about 4% lead titanate, and having a dielectric constant of about 7000, electrically in series with a phosphor-ceramic layer of dielectric constant of the order of 5 to 10 and about .002 inch thick, the voltage drop across the barium-lead titanate layer is less than 2% of the total applied voltage except in those areas where dielectric failure has occurred in the phosphor-ceramic layer. This barium titanate type layer has sufficient strength in those areas to withstand the total applied voltage.

Thus I have produced lamps of normal brightness with greatly improved dielectric strength and safety factor or with greatly improved brightness and a normal voltage safety factor. I can therefore produce lamps of much greater brightness and voltage range than previously available.

It is entirely practical to use other series capacitance materials and variations in lamp design to effect results similar to those described.

For example, other materials of high dielectric constant which can be used are rutile (titanium dioxide), steatite ceramic capacitor materials, of any numerous single or mixed compositions of barium, magnesium, lead or strontium combined as titanates, zirconates or stannates. Potassium niobate and other niobates can also be used. In general, any material of similar characteristics could be used with one or more representative lamp construction.

Figure 2:
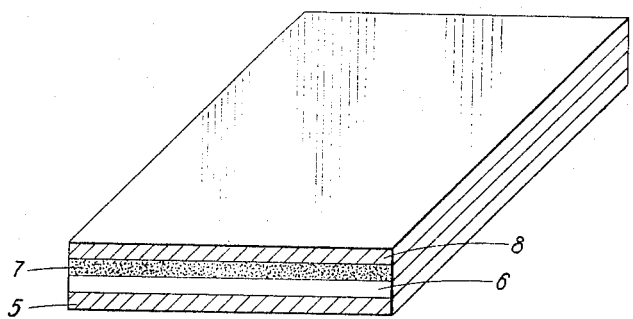

Other objects, features and advantages of the invention will be apparent from the following description, taken in connection with the accompanying drawings in which:

FIGURE 1 is a perspective view, partly in section, of an embodiment of the invention, and FIGURE 2 is a perspective view, partly in section, of another embodiment.

In FIGURE 1, a barium titanate plate 1, such as can be commercially obtained, of 0.025 inch thickness, has applied to one side thereof a layer 2 of a ceramic-phosphor mixture 0.002 inch thick, as shown in my copending application Serial No. 365,617 filed July 2, 1953, now abandoned. The phosphor material can be one of those shown in copending application Serial No. 230,711 filed June 8, 1951, now Patent No. 2,772,242 by Keith H. Butler, or can be some other electroluminescent material. A transparent conductive coating 3 can be applied to the outside surface of the electroluminescent phosphor-dielectric layer 2, and a metal coating 4 of aluminum or the like can be applied to the outside surface of the titanate sheet 1.

The lamp will emit light when a voltage is applied. Brightness of 20 to 30 foot-lamberts is obtained at about 800 volts.

In FIG. 2, another embodiment of the invention, is shown. A metal plate 5, preferably of the material known as No. 4 alloy, described in U.S. Patents 2,369,146, 2,371,627 and 2,394,919 granted on February 13, 1945, March 20, 1945 and February 12, 1946, respectively, to Walter Kingston, has applied thereto a glaze 6 of powdered barium titanate in a ceramic or glass of the type mentioned in describing the first example, and capable of sealing to the metal used, and then over that an electroluminescent layer 7, similar to layer 2 of example 1, is applied. A transparent conductive coating 8 is applied on the latter layer 7.

The application to the electrodes of a voltage of about 120 volts will cause the device to luminesce.

Although one specific embodiment has been described, it will be understood that various modifications can be made therein without departing from the spirit and scope of the invention. For example, a layer of high dielectric constant can be used on both sides of the phosphor dielectric-layer 2, 7, if desired, or the electrode on one side of the device can be split into two electrodes placed side by side and insulated from each other, with each of these electrodes connected to one side of a power line, and the electrode, on the other side of the device left electrically floating, that is not directly connected to the line, if desired. Either or both of the electrodes can be of photoconductive material, and at least such a floating electrode can be made of a photocapacitive material, for example of photoconductive particles embedded in dielectric material.

What I claim is:

1. In an electroluminescent lamp the combination of a metal plate, a glaze of a powdered material of high dielectric constant of the order of thousands and a ceramic over at least part of said metal plate, and a coating of electroluminescent material over said glaze.

2. The combination of claim 1, in which the material of high dielectric constant is selected from the group consisting of the titanates, zirconates and stannates of at least one of the substances selected from the group consisting of barium, magnesium, lead and strontium.

3. In an electroluminescent lamp the combination of a thin solid plate of material of high dielectric constant of the order of thousands, an electrode on one side of said plate, and an electroluminescent coating on the other side of said plate, in which the thin solid plate is extremely thick compared to the electroluminescent coating.

4. An electroluminescent lamp comprising two electrodes, an electroluminescent layer therebetween and a separate dielectric layer of high dielectric constant also therebetween, said separate dielectric layer being extremely thick compared to said electroluminescent layer.

References Cited by the Examiner

UNITED STATES PATENTS

| | | | |
|---|---|---|---|
| 2,566,349 | 9/1951 | Mager | 313—108 |
| 2,648,823 | 8/1953 | Kock et al. | 317—258 X |
| 2,652,518 | 9/1953 | Freeman | 317—258 X |
| 2,673,949 | 3/1954 | Khouri et al. | 317—242 |
| 2,684,450 | 7/1954 | Mager | 313—108 |
| 2,694,185 | 11/1954 | Kodama | 317—242 |
| 2,798,821 | 7/1957 | Lehmann | 313—108.1 |
| 2,798,823 | 7/1957 | Harper | 313—108 X |
| 2,840,741 | 6/1958 | Lehmann | 313—108.1 |
| 2,866,117 | 12/1958 | Walker et al. | 313—108.1 |

JAMES W. LAWRENCE, *Primary Examiner.*

RALPH G. NIELSON, GEORGE N. WESTBY, E. R. DOUGLAS, L. D. BULLION, E. G. GERMAIN, C. R. CAMPBELL, *Assistant Examiners.*